United States Patent
Sakakibara et al.

(10) Patent No.: US 10,488,840 B2
(45) Date of Patent: Nov. 26, 2019

(54) PRODUCTION CONTROL APPARATUS FOR CONTROLLING ACTUAL PRODUCTION INFORMATION IN PRODUCTION LINE AND PRODUCTION SYSTEM

(71) Applicant: FANUC CORPORATION, Yamanashi (JP)

(72) Inventors: Shinsuke Sakakibara, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 28 days.

(21) Appl. No.: 15/362,816

(22) Filed: Nov. 29, 2016

(65) Prior Publication Data
US 2017/0153616 A1 Jun. 1, 2017

(30) Foreign Application Priority Data
Nov. 30, 2015 (JP) .................................. 2015-233344

(51) Int. Cl.
*G05B 19/048* (2006.01)
*G05B 19/418* (2006.01)

(52) U.S. Cl.
CPC ..... *G05B 19/048* (2013.01); *G05B 19/41875* (2013.01); *G05B 2219/32366* (2013.01); *Y02P 90/02* (2015.11); *Y02P 90/04* (2015.11); *Y02P 90/10* (2015.11); *Y02P 90/30* (2015.11)

(58) Field of Classification Search
CPC ............ G05B 19/048; G05B 19/41875; G05B 2219/32366; Y02P 90/10; Y02P 90/02; Y02P 90/04
See application file for complete search history.

(56) References Cited

U.S. PATENT DOCUMENTS

| | | | | |
|---|---|---|---|---|
| 6,205,060 B1* | 3/2001 | Sanda | ..................... | G03B 17/26 365/189.04 |
| 6,381,509 B1* | 4/2002 | Thiel | ..................... | G06Q 10/06 382/282 |
| 8,843,403 B2* | 9/2014 | Laub | ..................... | G06Q 10/087 700/115 |
| 2002/0010520 A1* | 1/2002 | Matsubara | ........... | G05B 19/414 700/95 |
| 2003/0069658 A1* | 4/2003 | Yamazaki | .............. | G06Q 10/06 700/97 |

(Continued)

FOREIGN PATENT DOCUMENTS

| | | |
|---|---|---|
| CN | 1445692 A | 10/2003 |
| CN | 1809793 A | 7/2006 |

(Continued)

*Primary Examiner* — Brian W Wathen
*Assistant Examiner* — Brian T Mcmenemy
(74) *Attorney, Agent, or Firm* — Hauptman Ham, LLP (57) ABSTRACT

A production control apparatus includes a workpiece position detection unit, an ID generation unit, an ID notification unit, a data receiving unit, and a storage unit. The data receiving unit receives the unique IDs generated by the ID generation unit and the traceability data (actual production information) when the workpieces for which the unique IDs have been generated are processed, from the manufacturing machines to which the unique IDs have been notified by the ID notification unit. The storage unit records the unique IDs and the traceability data received by the data receiving unit in association with each other.

9 Claims, 4 Drawing Sheets

(56) References Cited

U.S. PATENT DOCUMENTS

| | | | |
|---|---|---|---|
| 2005/0203653 A1* | 9/2005 | Nakamura | G06Q 10/06 700/99 |
| 2005/0256788 A1* | 11/2005 | Mukai | G06Q 10/087 705/29 |
| 2007/0156281 A1* | 7/2007 | Leung | G06Q 10/08 700/225 |
| 2007/0168072 A1 | 7/2007 | Wang | |
| 2007/0203678 A1* | 8/2007 | Horiike | G06F 17/50 703/1 |
| 2009/0105870 A1* | 4/2009 | Dick | B27M 1/08 700/171 |
| 2014/0135969 A1* | 5/2014 | Groth | G05B 19/41865 700/112 |
| 2014/0358271 A1* | 12/2014 | Asakawa | G05B 19/41865 700/112 |
| 2015/0242736 A1* | 8/2015 | Glazer | G06Q 10/087 235/487 |

FOREIGN PATENT DOCUMENTS

| | | |
|---|---|---|
| CN | 101136086 A | 3/2008 |
| EP | 2107506 A1 | 10/2009 |
| JP | 2004-355534 A | 12/2004 |
| JP | 2005-141353 A | 6/2005 |
| JP | 2006-323505 A | 11/2006 |
| WO | 2013/111324 A1 | 8/2013 |
| WO | 2015/111225 A1 | 7/2015 |

\* cited by examiner

| FIRST MANUFACTURING MACHINE 15 | |
|---|---|
| WORKPIECE ID | TRACEABILITY DATA (ACTUAL PRODUCTION INFORMATION) |
| ID1-1 | A1 |
| ID1-2 | A2 |
| ID1-3 | A3 |
| ID1-4 | A4 |
| ... | ... |

| SECOND MANUFACTURING MACHINE 16 | |
|---|---|
| WORKPIECE ID | TRACEABILITY DATA (ACTUAL PRODUCTION INFORMATION) |
| ID2-1 | B1 |
| ID2-2 | B2 |
| ID2-3 | B3 |
| ID2-4 | B4 |
| ... | ... |

| THIRD MANUFACTURING MACHINE 17 | |
|---|---|
| WORKPIECE ID | TRACEABILITY DATA (ACTUAL PRODUCTION INFORMATION) |
| ID3-1 | C1 |
| ID3-2 | C2 |
| ID3-3 | C3 |
| ID3-4 | C4 |
| ... | ... |

FIG. 3

| WORKPIECE ID | PRODUCT ID |
|---|---|
| ID1-10 | 001 |
| ID2-101 | |
| ID3-200 | |
| ID1-11 | 002 |
| ID2-102 | |
| ID3-201 | |
| ⋮ | ⋮ |

PRODUCTION CONTROL APPARATUS FOR CONTROLLING ACTUAL PRODUCTION INFORMATION IN PRODUCTION LINE AND PRODUCTION SYSTEM

RELATED APPLICATIONS

The present application claims priority to Japanese Patent Application Number 2015-233344, filed Nov. 30, 2015, the disclosure of which is hereby incorporated by reference herein in its entirety.

BACKGROUND OF THE INVENTION

1. Field of the Invention

The present invention relates to a production control apparatus which controls actual production information in a production line and a production system provided with the same.

2. Description of the Related Art

In a machine factory, a production line in which a plurality of manufacturing machines such as machine tools or robots are arranged is built. If it is found that a product shipped through a production line is defective, a cause of defect can be surveyed extending back to the production process of the product. Specifically, in each manufacturing machine, the traceability is collected and stored in a database.

The traceability data means data which may affect the manufacturing quality, such as current values of motors for the machine tools or robots, etc., during machining, time required for machining, alarm information generated during machining, programs or parameters used during machining, identification numbers of tools used for machining, ambient temperature during machining, or a machining error measured by a measuring device after machining. In the case where the production line is formed by operators, information such as contents of operations, check results or measurements after operation, or ID numbers of the tools used, etc. is traceability data.

Such traceability data is stored in the database, together with ID numbers of the manufacturing machines or operators, product numbers, and dates of manufacture, etc. (see WO 2013/111324). If there is a defective product found among collected products, the date of manufacture of the defective product, and the manufacturing machine which was used to manufacture the defective product or the operator by whom the defective product was produced, are identified. Thereafter, the traceability data at the time when the defective product was produced is identified based on the specified date of manufacture or the ID number of the specified manufacturing machine or operator.

However, in the production line in which identical products are mass-produced, there is a large number of products produced by the same manufacturing machine or operator on the same date of manufacture, and accordingly, it is difficult to accurately identify the traceability data at the time when the defective product was manufactured. Namely, it is necessary to analyze the traceability data of all of the products that can be considered to have been produced on the date of manufacture on which the defective product was produced, and this makes it very difficult to discover the reason why the defective product was produced.

Under these circumstances, there has been a need of setting identification information for each product and administrating the traceability data for each product. To this end, Japanese Patent Application Publication No. 2004-355534 discloses a method for storing machining and assembling information of individual workpieces in association with the unique ID (identifier) of each workpiece in machining equipment.

More specifically, in the method disclosed in Japanese Patent Application Publication No. 2004-355534, an ID tag having an IC memory incorporated therein is attached to each workpiece beforehand and the traceability data is recorded in the IC memory each time the workpiece is machined and assembled. When a series of machining and assembling processes of the workpieces are finished to manufacture products, bar codes are attached to the individual products to allocate the ID numbers, and thereafter, the ID tags are removed from the products. The traceability data is read out from the removed ID tags and is stored in a storage device of a host computer in association with the ID numbers of the products. Thus, if a defective product is found from among the shipped products, the ID number of the defective product is read out from the bar code attached to the defective product and is inputted to the host computer, whereby the traceability corresponding to the ID information of the defective product can be retrieved.

However, the method disclosed in Japanese Patent Application Publication No. 2004-355534 has the following drawbacks.

It is impossible to record the traceability data more than the capacity of the IC memory incorporated in the ID tag.

When the products are mass-produced, it is necessary to prepare a large number of ID tags, thus resulting in an increase in cost.

As it is necessary to attach the ID tags to the workpieces during the manufacturing process from the commencement of machining of the workpieces to the completion of the products, the workpieces must be those which can be machined and assembled with the ID tags attached thereto.

When a product is completed by assembling a plurality of workpieces during the manufacturing process, the ID tag on which the traceability data is to be recorded is ambiguous among the ID tags individually attached to the plurality of workpieces assembled. Moreover, the ID tag having the traceability data recorded thereon cannot be removed from the workpiece without disassembling the product.

SUMMARY OF THE INVENTION

The present invention provides a production control apparatus which is capable of controlling the traceability data for each workpiece without using an ID tag, and easily specifying the traceability data from a defective product, and a production system provided with the same.

According to a first aspect of the invention, there is provided a production control apparatus for controlling actual production information of a production line in which a plurality of manufacturing machines are arranged, comprising a workpiece position detection unit which detects a manufacturing machine in which each workpiece supplied to the production line is positioned, among the plurality of manufacturing machines, an identifier generation unit which generates an identifier unique to the workpiece when the workpiece position detection unit detects that the workpiece is positioned in any of the plurality of manufacturing machines, an identifier notification unit which notifies the manufacturing machine in which the workpiece for which the identifier has been generated is positioned, of the identifier generated by the identifier generation unit, a data receiving unit which receives the identifier generated by the identifier generation unit and the actual production information when the workpiece assigned the identifier is processed from the manufacturing machine to which the identifier has been notified, and a storage unit in which the identifier and the actual production information received by the data receiving unit are recorded in association with each other.

According to a second aspect of the invention, in the production control apparatus according to the first aspect, the storage unit further records the plurality of identifiers generated by the identifier generation unit each time the workpieces are successively moved to the plurality of manufacturing machines and an identifier of a product made of the workpieces for which the identifiers have been generated in association with each other.

According to a third aspect of the invention, the production control apparatus according to the second aspect comprises an input and output unit for inputting the identifier of the product and outputting the actual production information of the workpieces of which the product is made.

According to a fourth aspect of the invention, in the production control apparatus according to the second or third aspect, when two or more workpieces processed by two or more manufacturing machines among the plurality of manufacturing machines are assembled by another manufacturing machine, the storage unit records the plurality of identifiers generated by the identifier generation unit for the two or more workpieces in association with each other as a tree structure data.

According to a fifth aspect of the invention, in the production control apparatus according to any one of the first to fourth aspects, the manufacturing machines are each provided with a storage unit in which the identifiers generated by the identifier generation unit and the actual production information when the workpieces for which the identifiers have been generated are processed are stored.

According to a sixth aspect of the invention, there is provided a production system comprising a production control apparatus according to any one of the first to fifth aspects, a production line in which the plurality of manufacturing machines are arranged, and a host computer having a database connected to the production control apparatus through a communication device.

BRIEF DESCRIPTION OF THE DRAWINGS

The aforementioned objects, features and advantageous effects and other objects, features and advantageous effects of the present invention will be more clearly understood from the detailed description of the representative aspects of the invention illustrated in the accompanying drawings.

DETAILED DESCRIPTION

Embodiments of the present invention will be described below with reference to the drawings. In the drawings, the same components or functional parts are assigned the same reference numerals. For easy understanding, the scale of each drawing has been appropriately changed. The embodiments illustrated in the drawings are merely examples to implement the present invention and the present invention is not limited thereto.

Figure 1:
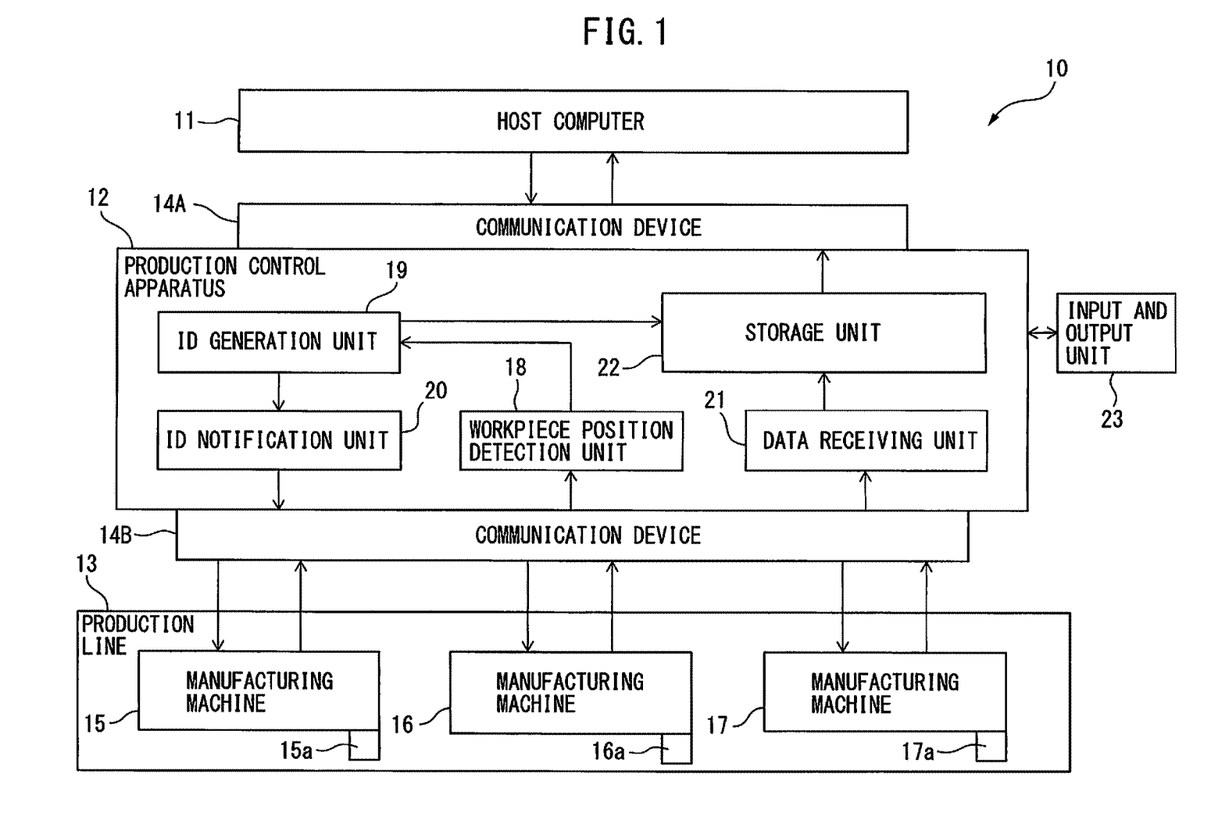
FIG. 1 is a block diagram showing a production system provided with a production control apparatus according to an embodiment of the present invention.

FIG. 1 is a block diagram showing a production system provided with a production control apparatus according to an embodiment of the present invention.

With reference to FIG. 1, a production system 10 is composed of a master computer (host computer) 11 having a database, a production control apparatus 12, and at least one production line 13.

For example, the host computer 11 is arranged in a base of a company and the production control apparatus 12 and the production line 13 are arranged in a factory, etc. remotely located from the base.

The host computer 11 and the production control apparatus 12 are connected to each other through a communication device 14A, e.g., a network, such as the Internet. The production control apparatus 12 and the production line 13 are connected to each other through a communication device 14B, e.g., a network such as an intranet.

The production line 13 is an assembly (which can also be referred to as production cell) of flexibly combined manufacturing machines to produce products and is built of a plurality of manufacturing machines 15, 16 and 17. In this embodiment, three manufacturing machines 15 to 17 are illustrated, but the number of the manufacturing machines is not limited thereto.

Each of the manufacturing machines 15 to 17 is an NC machine tool or an industrial robot. As a matter of course, each manufacturing machine is not limited to an NC machine tool or a robot, but may be a transfer machine, a measuring device, a tester, a press machine, a press-fitting machine, a printing machine, a die casting machine, an injection molding machine, a food machine, a packaging machine, a welding machine, a washing machine, a painting machine, an assembling machine, a mounting machine, a woodworking machine, a sealing device, or cutting machine, etc.

The production control apparatus 12 and the manufacturing machines 15 to 17 are each composed of a computer system (not shown) comprising a memory such as a RAM or a ROM, a CPU, and a communication control unit, which are interconnected through a bus. The communication control unit controls communications of data between the production control apparatus 12 and each of the manufacturing machines 15 to 17. The function and operation of the production control apparatus 12 and each of the manufacturing machines 15 to 17 are preferably achieved by the respective CPUs which execute the programs stored in the respective ROMs.

The production control apparatus 12 will be described below in more detail.

The production control apparatus 12 controls the actual production information of the production line 13. The term "actual production information" has the same meaning as the traceability mentioned in the Background of the Invention.

As can be seen in FIG. 1, the production control apparatus 12 is provided with a workpiece position detection unit 18, an ID generation unit 19, an ID notification unit 20, a data receiving unit 21, and a storage unit 22.

The workpiece position detection unit 18 detects whether the workpiece supplied to the production line 13 is positioned in the manufacturing machine 15, 16 or 17.

If the manufacturing machines 15 to 17 are NC machine tools or industrial robots, in general, the NC machine tool has a tool for clamping the workpiece and the industrial robot has a hand for grasping the workpiece. Such a tool or hand is provided with a sensor. Therefore, it is possible to detect whether the tool clamps the workpiece or the hand grasps the workpiece by the sensor. The signal from the sensors is transmitted to the workpiece position detection unit 18 from each of the manufacturing machines 15 to 17 through the communication unit 14B. Furthermore, the production control apparatus 12 is provided with a production system model to indicate how the workpiece is moved in accordance with the operation program or machining program in the production system 10 and where the workpiece is to be positioned when the program is executed.

Namely, the workpiece position detection unit 18 detects the ON/OFF signals of the sensors while monitoring the production system model, thereby identifying the manufacturing machine in which the workpiece supplied to the production line 13 is present. The method in which the location where each workpiece is present in the production line 13 is specified is disclosed in Japanese Patent 4465012 assigned to the applicant of the present application.

When the workpiece position detection unit 18 detects that the workpiece is positioned in the manufacturing machine which carries out the first manufacturing process, e.g., the first manufacturing machine 15, the ID generation unit 19 shown in FIG. 1 generates a unique ID (identifier) for the workpiece positioned in the first manufacturing machine 15. Namely, each time a plurality of workpieces are successively supplied to the first manufacturing machine 15, a unique ID is allocated to each of the workpieces positioned in the first manufacturing machine 15.

Each time a unique ID is generated for each workpiece positioned in the first manufacturing machine 15, the ID notification unit 20 shown in FIG. 1 notifies the first manufacturing machine 15 of the unique ID of the workpiece thus generated.

Furthermore, as mentioned above, when the workpiece is positioned in the first manufacturing machine 15, the production control apparatus 12 instructs the first manufacturing machine 15 or the operator who operates the same to commence production. In response to the instructions to commence production, the first manufacturing machine 15 processes the workpiece in accordance with the process program pre-stored in the storage unit 15a. In the case where the manufacturing machine 15 is, for example, a machining center, this process is a machining process performed by the machining center. Moreover, during the machining process of the workpiece, the aforementioned traceability is stored in the storage unit 15a of the first manufacturing machine 15.

The first manufacturing machine 15 to which the unique ID of the workpiece has been notified transmits the traceability data obtained during the processing of the workpiece to the production control apparatus 12 together with the unique ID of the workpiece through the communication unit 14B after the processing of the workpiece is completed. This transmission may be carried out by the operator who operates a control panel (not shown) for operating the first manufacturing machine 15. Moreover, the transmission may be carried out a predetermined time after the completion of the processing of the workpiece by the first manufacturing machine 15.

Thereafter, the data receiving unit 21 of the production control apparatus 12 shown in FIG. 1 receives the unique ID of the workpiece and the traceability data, transmitted from the first manufacturing machine 15.

The storage unit 22 stores therein the unique ID of the workpiece and the traceability data received by the data receiving unit 21 in association with each other. Thus, the traceability data regarding the workpiece processed by the first manufacturing machine 15 can be extracted from the storage unit 22 of the production control apparatus 12, using the unique ID of each workpiece.

Note that, the unique workpiece ID and the traceability data may be stored in association with each other not in the storage unit 22 of the production control apparatus 12 but in the storage unit 15a of the first manufacturing machine 15. In this case, it is preferable that the traceability data stored in the storage unit 15a of the first manufacturing machine 15 can be requested from the production control apparatus 12, by the use of the unique workpiece ID. To this end, preferably, an input and output device 23 such as a display or a keyboard is connected to the production control apparatus 12.

The above description has been applied to only the case that the workpiece position detection unit 18 detects that the workpiece is positioned in the first manufacturing machine 15 of the production line 13. However, in this embodiment, the unique workpiece ID and the traceability data are recorded in the storage unit 22 in association with each other also when the workpiece is positioned and processed in the second manufacturing machine 16 or the third manufacturing machine 17, in the same manner as above.

Figure 2:
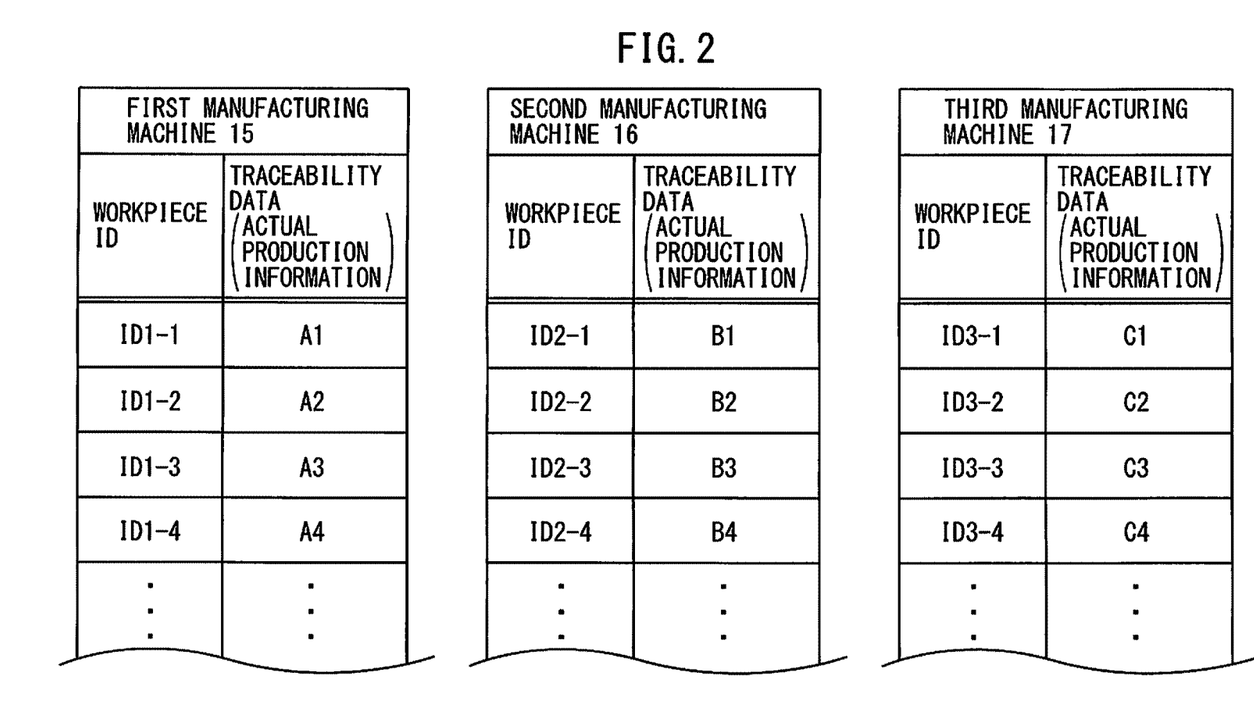
FIG. 2 shows record tables on which a unique ID of each workpiece processed by each manufacturing machine and traceability data are recorded in association with each other.

FIG. 2 shows a record table of the storage unit 22 on which the unique IDs of the individual workpieces processed by the manufacturing machines 15 to 17 and the traceability data are recorded in association with each other. As may be seen in FIG. 2, the traceability data of the workpieces are recorded in the storage unit 22 in association with the unique IDs generated for the workpieces which are positioned in the respective manufacturing machines 15, 16 and 17. For example, when a plurality of workpieces are successively processed by the first manufacturing machine 15, unique IDs, such as ID1-1, ID1-2, ID1-3, ID1-4, . . . are successively generated for the corresponding workpieces supplied to the first manufacturing machine 15. Furthermore, the traceability data A1, A2, A3, A4, . . . of the workpieces successively processed by the first manufacturing machine 15 are successively recorded in association with the unique IDs of the respective workpieces.

In the production control apparatus 12 according to the illustrated embodiment, as mentioned above, when the workpiece is positioned in each of the manufacturing machines 15, 16 and 17 on the production line 13, the unique ID of the workpiece is generated by the ID generation unit 19. Therefore, each time a certain workpiece is successively moved to the plurality of manufacturing machines 15, 16 and 17, a new unique ID is generated for the certain workpiece. In other words, each time the certain workpiece is successively moved to the manufacturing machines, the unique ID is replaced with a new ID. Therefore, the storage unit 22 of the production control apparatus 12 of the illustrated embodiment records the unique workpiece IDs which are successively replaced in association with each other. This will be described below in more detail.

The production line 13 may be a line (hereinafter referred as to continuous line) in which a certain workpiece is successively processed by a plurality of manufacturing machines to produce an end product. Alternatively, the production line 13 may be a line (hereinafter referred as to assembly line) in which two or more workpieces (parts) which have been processed by the respective manufacturing machines are assembled to produce and end product. Yet alternatively, the production line 13 may be a production line in which two or more workpieces which have been processed by two or more production lines 13 are combined during the manufacturing process.

First, the production line 13 that is the above continuous line will be described below.

It is assumed that a certain workpiece is successively processed by the first manufacturing machine 15, the second manufacturing machine 16, and the third manufacturing machine 17 shown in FIG. 1. In this case, each time the workpiece position detection unit 18 detects that the workpiece is positioned in any of the manufacturing machines 15 to 17, the ID generation unit 19 generates a new unique ID for that workpiece. Thus, a workpiece which has been processed by the manufacturing machines 15, 16 and 17 is assigned three different unique IDs. The storage unit 22 receives and records the three unique IDs from the ID generation unit 19. As a matter of course, if the workpiece is successively processed by more than three manufacturing machines, more than three different unique IDs are generated and recorded in the storage unit 22.

When the workpiece is successively processed and an end product is obtained, as mentioned above, a bar code representative of an encoded unique ID of the product, e.g., an encoded serial number is attached to the product. The bar code is, for example, a matrix type two-dimensional bar code. It is preferable that the bar code on the product be read by a reader (not shown) so that the unique ID of the product can be recorded in the storage unit 22 of the production control apparatus 12. Such a reader may be arranged on the production line 13.

The storage unit 22 of the production control apparatus 12 stores the three different unique IDs generated during the successive manufacturing processes of the workpiece and the unique ID of the product produced by successively processing the workpiece, in association with each other.

Figure 3:
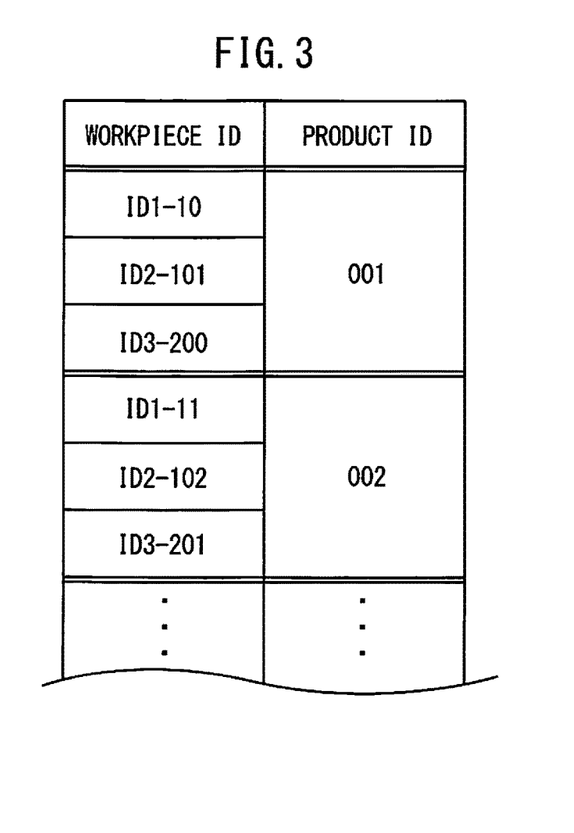
FIG. 3 shows an example of a data structure when three unique IDs generated in the course of successive processes of the workpieces and unique IDs of the products obtained by successively processing the workpieces are recorded in association with each other.
Figure 4:
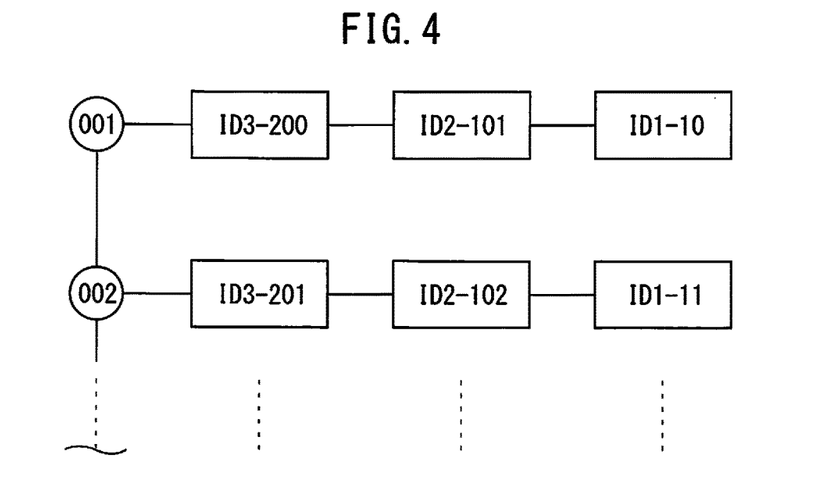
FIG. 4 shows another example of a data structure when three unique IDs generated in the course of successive processes of the workpieces and unique IDs of the products obtained by successively processing the workpieces are recorded in association with each other.

FIG. 3 shows an example of a data structure when the three different unique IDs generated during the successive manufacturing processes of the workpiece and the unique ID of the product produced by successively processing the workpiece are stored in association with each other. FIG. 4 shows another example of the data structure.

For example, the three different IDs generated during the successive processes of a certain workpiece are assumed to be "ID1-10", "ID2-101" and "ID3-200", respectively. The "ID1-10" represents the 10-th workpiece processed in the first manufacturing machine 15, "ID2-101" represents the 101-st workpiece processed in the second manufacturing machine 16, and "ID3-200" represents the 200-th workpiece processed in the third manufacturing machine 17. The three unique IDs are associated in series with each other and with the serial numbers (001, 002, . . . , etc.) which are the product unique IDs as well.

Next, the production line 13 that is the above assembly line will be described below.

It is assumed that in the production line 13, the workpiece (part) processed by the first manufacturing machine 15 and the workpiece (part) processed by the second manufacturing machine 16 are assembled by the third manufacturing machine 17 during the manufacturing process to produce an end product.

In this case, when the workpiece position detection unit 18 detects that the workpieces are positioned in the first manufacturing machine 15 and the second manufacturing machine 16, respectively, the ID generation unit 19 generates a new unique ID for each of the workpieces positioned in the first and second manufacturing machines 15 and 16. It should be recalled that the unique ID generated for the workpiece positioned in the first manufacturing machine 15 and the unique ID generated for the workpiece positioned in the second manufacturing machine 16 are different from each other. Thereafter, the workpiece processed by the first manufacturing machine 15 and the workpiece processed by the second manufacturing machine 16 are moved to the third manufacturing machine 17 and are combined therein.

When it is detected by the workpiece position detection unit 18 that the two workpieces are positioned in the third manufacturing machine 17, the ID generation unit 19 generates one new unique ID for a set of two workpieces. The ID generation unit 19 generates a tree structure data which represents that the unique IDs of the two combined workpieces are combined to form a new unique ID. Alternatively, the ID generation unit 19 may generate a tree structure data which represents that one of the two combined unique workpiece IDs is made invalid and only the other unique workpiece ID is made valid.

Moreover, if the two workpieces which have been processed are combined to produce an end product, a bar code representative of an encoded unique product ID, e.g., an encoded serial number of the product, is attached to the end product, as in the case of the continuous line mentioned above.

It is preferable that the bar code on the product be read out by a reader (not shown) so that the unique ID of the product can be recorded in the storage unit 22 of the production control apparatus 12. Such a reader may be arranged on the production line 13.

The storage unit 22 of the production control apparatus 12 stores the three different unique IDs generated during the successive manufacturing processes of the two workpiece and the assembling process and the unique ID of the product produced by combining the two processed workpiece, in association with each other as a tree structure data.

Figure 5:
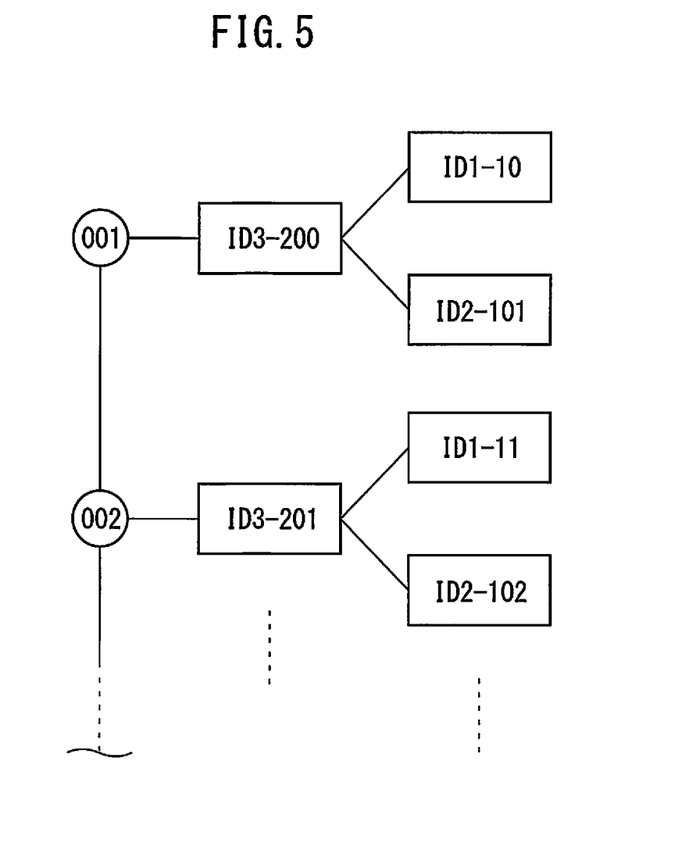
FIG. 5 shows an example of a tree structure which is a data structure when three unique IDs generated in the course of successive processes or assembling of two workpieces and unique IDs of the products obtained by assembling the two processed workpieces are recorded in association with each other.

FIG. 5 shows an example of a tree structure that is a data structure when the three different unique IDs generated during the successive manufacturing processes of the two workpieces and the assembling process and the unique ID of the product produced by combining the two processed workpieces are recorded in association with each other.

For example, the different IDs of the two workpieces to be combined are assumed to be "ID1-10", "ID2-101", respectively, and the unique ID of the assembly obtained by combining the two workpieces is "ID3-200". Note that, the meaning of the unique IDs assigned to the workpiece and the assembly is the same as that in the aforementioned continuous line. The three unique IDs are associated with each other as a tree structure data as shown in FIG. 5 and are also associated with the serial numbers (001, 002, . . . , etc.) which are unique product IDs.

As may be understood from the foregoing, according to the production control apparatus 12 of the illustrated embodiment, a unique ID is generated for each workpiece positioned in each of the plurality of manufacturing machines 15 to 17 on the production line 13 by the ID generation unit 19. The unique workpiece IDs and the traceability data (actual production information) of the workpieces with respect to the manufacturing machines in which the workpieces are positioned are recorded in association with each other in the storage unit 22 (FIG. 2). Namely, in the illustrated embodiment, it is possible to automatically control the traceability data of the individual workpieces without attaching a recording medium such as an IC memory or the like to the individual workpieces.

Moreover, according to this embodiment, the plurality of IDs generated for the workpieces during the successive manufacturing processes of the workpieces by the plurality of manufacturing machines 15 to 17 to produce an end product are recorded in association with each other in the storage unit 22.

Therefore, if there is a defective product found among the products shipped through the production line 13 such as the aforementioned continuous line or assembly line, the plurality of unique IDs generated for the workpieces of which the defective product is made can be extracted from the storage unit 22, using the unique ID of the defective product. As the unique IDs of the workpieces and the traceability data are associated with each other, it is possible to easily specify the traceability data of the workpieces of which the defective product is made from the unique IDs of the workpieces of which the defective product is made. This is preferably carried out by the use of the input and output unit 23. Namely, preferably, the product unique ID is input to the production control apparatus 12 through the input and output unit 23, and the traceability data of the workpieces of which the defective product is made is output from the production control apparatus 12 to the input and output unit 23.

Furthermore, in the production control apparatus 12 as mentioned above, it is not necessary to attach an ID tag to the individual workpieces, unlike the prior art. Consequently, it is possible to reduce the manufacturing cost compared with the prior art, and to increase the storage capacity for the traceability data of the workpieces. In addition to the foregoing, as no ID tag is attached to the workpiece, the workpieces to be processed and assembled can be freely selected.

In the aforementioned embodiments, as shown in FIG. 1, the traceability data of the workpieces may be transferred from the storage unit 22 of the production control apparatus 12 to the host computer 11 through the communication unit 14A and stored in the database of the host computer 11. Moreover, only a portion of the traceability data stored in the storage unit 22 of the production control apparatus 12 may be transferred to the host computer 11. Furthermore, when the traceability data is transferred to the host computer 11, it is preferable that the traceability data be transferred after processing the traceability data into abstraction data or feature extraction data.

Moreover, the traceability data associated with the unique workpiece IDs may be dispersively stored in the database of the host computer 11, the storage unit 22 of the production control apparatus 12, and each of the storage units 15a to 17a of the plurality of manufacturing machines 15 to 17, in the production system 10.

Namely, the unique IDs to be allocated to the workpieces from which the product is to be made are replaced with new IDs each time the workpieces are successively moved to the plurality of manufacturing machines 15 to 17, and the new IDs of the workpieces are correlated with each other and recorded in the storage unit 22 of the production control apparatus 12. The unique workpiece IDs are correlated with the traceability data. Therefore, even if the traceability data is dispersively stored in the production system 10, as mentioned above, it is possible to easily retrieve or refer to the traceability data of the workpieces from the production system 10 using the unique workpiece IDs. Moreover, it is also possible to aggregate the dispersively stored traceability data, if necessary.

The aforementioned storage unit 22 of the production control apparatus 12 and the storage units 15a to 17a of the plurality of manufacturing machines 15 to 17 are each preferably provided with at least one of, for example, a magnetic tape device, a magnetic disc device, and an optical disc device. Alternatively, each of the storage units may be a memory device such as a RAM (Random Access Memory) or a ROM (Read Only Memory), a fixed disc device such as a hard disc, or a portable storage device such as a flexible disc or an optical disc.

The present invention has been described above with reference to the representative embodiments, but it will be understood by a person skilled in the relevant art that the aforementioned modifications, a variety of other modifications, changes, omissions, and additions can be made without departing from the scope of the present invention.

EFFECTS OF THE INVENTION

According to the first, fifth and sixth aspects of the present invention, when the workpiece is positioned in any of the plurality of manufacturing machines, a unique identifier for the workpiece is generated, and the unique identifier of the workpiece thus generated and the actual production information (traceability data) of the workpiece by the manufacturing machine in which the workpiece is positioned are recorded in association with each other in the storage unit of the production control apparatus. Therefore, it is possible to automatically control the actual production information (traceability data) of the individual workpieces without attaching recording media such as IC memories to the individual workpieces.

According to the second, third and fourth aspects of the present invention, if there is a defective product found among the products shipped through the production line, it is possible to extract the plurality of identifiers generated for the workpieces of which the defective product is made from the storage unit, by the use of the identifier of the defective product. Moreover, as the identifier of each workpiece and the actual production information are correlated with each other, the actual production information of the workpieces of which the defective product is made can be easily retrieved from the identifiers of the workpieces of which the defective product is made.

Furthermore, according to each aspect of the present invention, it is not necessary to attach IC tags to the individual workpieces and record and control the actual production information of the workpieces in the memories of the IC tags, unlike the prior art. Therefore, it is possible to reduce the manufacturing cost compared with the prior art and to increase the storage capacity to record the actual production information of the workpieces. Furthermore, as no IC tag is attached to the workpiece, the workpieces to be processed and assembled can be freely selected.

The invention claimed is:

1. A production control apparatus for controlling actual production information of a production line in which a plurality of manufacturing machines are arranged, comprising:
a processor which
detects a manufacturing machine in which each workpiece supplied to the production line is positioned, among the plurality of manufacturing machines,
generates an identifier unique to the workpiece when detecting that the workpiece is positioned in any of the plurality of manufacturing machines,
notifies the manufacturing machine in which the workpiece for which the identifier has been generated is positioned, of the generated identifier, and
receives the generated identifier and the actual production information from the manufacturing machine when the workpiece assigned with the generated identifier is processed by the manufacturing machine to which the generated identifier has been notified; and
a memory in which (a) the received identifier and (b) the received actual production information are recorded in association with each other,
wherein
the memory further records
(i) a plurality of identifiers for each of workpieces, an identifier among the plurality of identifiers being generated each time the workpiece is successively moved to a corresponding manufacturing machine among the plurality of manufacturing machines, and
(ii) an identifier of a product made of the workpieces for each of which the plurality of identifiers have been generated, and
the number of the plurality of identifiers of each workpiece recorded by the memory corresponds to the number of the plurality of manufacturing machines to which the workpiece is successively moved.

2. The production control apparatus according to claim 1, further comprising an input and output unit for inputting the identifier of the product and outputting the actual production information of the workpieces of which the product is made.

3. The production control apparatus according to claim 2, wherein when two or more workpieces processed by two or more manufacturing machines among the plurality of manufacturing machines are assembled by another manufacturing machine, the memory records, as tree structure data, the plurality of identifiers generated for each workpiece among the two or more workpieces in association with the plurality of identifiers generated for another workpiece among the two or more workpieces.

4. The production control apparatus according to claim 1, wherein the manufacturing machines are each provided with a memory in which the generated identifiers and the actual production information when the workpieces for which the identifiers have been generated are processed are stored.

5. The production control apparatus according to claim 1, wherein the processor associates in series the plurality of identifiers generated for the workpieces successively processed in a continuous production line.

6. The production control apparatus according to claim 1, wherein the processor generates a new identifier for a set of two or more workpieces assembled in an assembly line and generates a tree structure data which represents that the plurality of identifiers for the two or more workpieces are combined to form the new identifier.

7. The production control apparatus according to claim 6, wherein the new identifier is a valid one of the plurality of identifiers generated for the two or more workpieces.

8. The A production control apparatus according to claim 1, wherein the actual production information includes traceability data of the workpieces.

9. A production system, comprising:
a production control apparatus,
a production line in which the plurality of manufacturing machines are arranged, and
a host computer having a database connected to the production control apparatus through a communication device,
wherein the product control apparatus is configured to control actual production information of the production line, and
wherein
the product control apparatus includes:
a processor which
detects a manufacturing machine in which each workpiece supplied to the production line is positioned, among the plurality of manufacturing machines,
generates an identifier unique to the workpiece when detecting that the workpiece is positioned in any of the plurality of manufacturing machines,
notifies the manufacturing machine in which the workpiece for which the identifier has been generated is positioned, of the generated identifier, and
receives the generated identifier and the actual production information from the manufacturing machine when the workpiece assigned with the generated identifier is processed by the manufacturing machine to which the generated identifier has been notified; and
a memory in which (a) the received identifier and (b) the received actual production information are recorded in association with each other,
the memory further records
(i) a plurality of identifiers for each of workpieces, an identifier among the plurality of identifiers being generated each time the workpiece is successively moved to a corresponding manufacturing machine among the plurality of manufacturing machines, and
(ii) an identifier of a product made of the workpieces for each of which the plurality of identifiers have been generated, and
the number of the plurality of identifiers of each workpiece recorded by the memory corresponds to the number of the plurality of manufacturing machines to which the workpiece is successively moved.

* * * * *